Patented Nov. 11, 1941

2,262,720

UNITED STATES PATENT OFFICE 2,262,720

MEDICINAL COMPOSITION

Clarence E. Earle, Washington, D. C.

No Drawing. Application June 21, 1940,
Serial No. 341,780

8 Claims. (Cl. 167—65)

This invention relates to compositions which contain complexes of certain phenolic amines and acidic oxidation products of petroleum hydrocarbons. Such compositions are particularly valuable as surface anesthetics having parasiticidal bactericidal and fungicidal properties, and they are useful in the control of micro-organisms, such as staphylococcus aureus, tricophyton, aspergillus, acarides, etc.

Although the synthetic carboxylic acids obtained from the oxidation of petroleum hydrocarbons have already been suggested for use as germicides, no practical means for their utilization has heretofore been available. The acids by themselves or in diluted form of sufficient strength to obtain germicidal activity are highly irritating to human and animal tissue. Their known metal salts or esters, while less irritating have not proved to be fully effective or entirely free from detrimental effects.

Among the objects of this invention, it is proposed: to provide compositions in which the synthetic carboxylic acids from the oxidation of petroleum hydrocarbons are utilized without undue irritation or detrimental effects; to provide germicidal and fungicidal compositions with surface anesthetic properties; to provide ointments, creams, oils, emulsions, lotions, soaps, and the like which are germicidal and fungicidal compositions and which at the same time allow prompt healing and granulation of wounds, abrasions, ulcers, etc.; to prepare compositions which allay pruritic irritation; and to provide preparations possessing keratoplastic properties.

I have discovered that compositions based on water-insoluble acidic oxidation products of petroleum hydrocarbons together with certain phenolic amines which will be described below have anesthetic properties by which terminal nerves are dulled, pruritic itching allayed, and repair and granulation allowed to proceed rapidly. I have found further that these compositions are of exceptional merit as fungicidal and germicidal preparations and are devoid of the faults of the acids when used alone or in the form of their metal salts or esters. The compositions of this invention have also a keratoplastic effect rather than a keratolytic effect as might be expected from the presence of acids, apparently as a result of the enlargement of capillary vessels following application of one of my compositions to a surface.

The amines used with the acidic oxidation products of hydrocarbons are hydroxybenzyl non-aromatic amines of the general formula

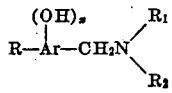

wherein Ar represents a phenyl nucleus, R represents hydrogen or a hydrocarbon group, $x$ is an integer 1 or 2, $R_1$ and $R_2$ are lower alkyl groups when taken singly or together represent a saturated divalent radical which jointly with the nitrogen form a heterocycle. Thus R, when a hydrocarbon group, may be methyl, ethyl, isopropyl, butyl, octyl, isooctyl, alpha-alpha-gamma-gamma-tetramethylbutyl, dodecyl, oleyl, phenyl, benzyl, cyclohexyl, etc. $R_1$ and $R_2$ may be such groups as methyl, ethyl, isopropyl, butyl, benzyl, cyclohexyl, etc., or a divalent group forming a heterocycle with the nitrogen such as morpholino-, piperidino-, pyrrolidino-, etc. In the most available types of hydroxybenzylamines there may be present one or more aminomethyl groups, which are ortho or para or both ortho and para to the hydroxyl group. The alkyl hydroxybenzylamines are preferred. The term "hydroxybenzyl non-aromatic tertiary amine" is used to designate those hydroxybenzylamines in which the nitrogen is connected directly to an aliphatic, alicyclic, or heterocyclic group, and not directly to an aromatic ring.

The acidic oxidation products which are reacted with the above amines are obtainable by the oxidation of petroleum hydrocarbons in the presence of a catalyst, such as a salt of manganese or cobalt. They comprise mixtures of water-insoluble straight and branched chain mono- and di-carboxylic acids, keto- and hydroxy- acids, lactones, together with alcohols, ketones, and aldehydes in small amounts. In the preparation of these acids it is the usual practice to pass oxygen or air through oils, waxes, or other hydrocarbons at such a rate that the temperature is controlled and usually maintained below 155° C. under pressures of 150 to 350 lbs. per sq. in. The oxidized materials are then separated by several steps. It is customary to wash out acids of small molecular size with water, that is, those acids with about five or fewer carbon atoms per molecule. The acids of molecular sizes from about six carbon atoms to above 20 carbon atoms are readily separated from non-saponifiable materials by conventional methods and may be further purified and fractionated by distillation when so desired. These acids are readily obtainable at the present time as articles of commerce.

In preparing the compositions of this invention a phenolic amine and a water-insoluble acidic oxidation product from petroleum are mixed. While this may be done directly, it is preferable to mix the materials in an oily vehicle which may also serve to carry the active materials and to serve as a diluent. As an oily vehicle there may be used animal, vegetable, or mineral oils. The essential materials may also be mixed in a volatile solvent such as toluene which is later removed. There is a definite reaction between the amine and acidic materials, accompanied by an evolution of considerable heat, but the exact nature of this reaction is not known. From about one to about fifty parts of the amine may be used for each twenty-five parts of the acidic material. The presence of free acid is not, as might be supposed, detrimental, nor is it essential. The oxidation products remain active even though more amine is used than is equivalent to the acid. As small an amount of a phenolic amine as a few tenths per cent of the preparation has a definitely desirable action and permits the acid to be used without detrimental effects. The combination of amine and acid yields results not possible with either ingredient alone.

In reacting or diluting the amine and acid there may be used as a fluxing and diluting agent a bland oil, such as castor oil. A mixture of 25% of the amine-acid complex and 75% of an oil forms a particularly useful stock material, from which more dilute preparations can be easily prepared. Cottonseed oil, olive oil, sunflower oil, peanut oil, or other bland vegetable oil, benzoinated lard, goose grease, or a petroleum oil such as refined white mineral oil are other suitable solvents or vehicles. There may also be used as vehicles or carriers, when desired, petrolatum, lanolin, high aliphatic alcohols such as cetyl alcohol, waxes, such as bees wax, hydrogenated castor oil, paraffin, etc. Mixtures of various oils and waxy materials may also be used in preparing ointments and the like. Another type of carrier which is effective is soap. There may likewise be used fillers such as clay, diatomaceous earth, titanium oxide, etc. Also perfumes or dyes may be added.

The preparation may be used in the form of an oil, an ointment, an emulsion, a cream, or in other useful form. The minor changes necessary to produce the preparation in various forms will be obvious to those skilled in the art.

The following examples show typical preparations:

Example 1.—In 1300 parts of castor oil there was dissolved with warming 280 parts of ter-butylhydroxybenzyldiethylamine and 175 parts of a water-insoluble iso-paraffinic acid preparation obtained by oxidation of paraffinic lubricating oils in the presence of a manganese catalyst and having an average molecular weight of approximately 174. Considerable heat was evolved. A practically clear solution resulted. The preparation was used for the treatment of mangy dogs with marked success. Dogs which would ordinarily have been killed were rubbed with the oil every few days. The dogs stopped scratching and were restored to health in a short time. There was no return of the infections.

Example 2.—A mixture of 31 parts of isooctyl-hydroxybenzyldimethylamine and 17.5 parts of a water-insoluble acidic oxidation product of paraffinic hydrocarbons containing small amounts of non-saponifiable materials and having a molecular range of six to sixteen carbon atoms was gently warmed while 150 parts of a medicinal mineral oil was stirred in. Heat was evolved. This concentrate was mixed with two parts of cetyl alcohol, 50 parts of petrolatum, 50 parts of lanolin, and 50 parts of titanium dioxide. It was used for the treatment of itching ringworm infection with marked success and for the control of painful athlete's foot. Healing was prompt and without any untoward effects.

Example 3.—A mixture of 25 parts of isooctyl-hydroxybenzyldimethylamine, 20 parts of water-insoluble acidic oxidized paraffins consisting essentially of straight and branched chain acids, keto- and hydroxy-acids, and lactones, and 135 parts of castor oil was warmed and a clear solution resulted. The product thus obtained was applied to itching auditory canals infected with aspergillum niger and with a secondary infection of staphylococcus aureus. The clinical records show immediate cessation of pruritis and exceptional results in the treatment of these infections.

Example 4.—There was added to 82 parts of light medicinal mineral oil 15 parts of iso-paraffinic acids obtained in the catalytic oxidation of petroleum oils. The acids had been purified by washing the oxidation products with water to remove the acids of low molecular weight, neutralizing with caustic soda solution to dissolve the acids, separating the non-saponifiable matter, liberating the acids by treatment with sulfuric acid, washing the acids, drying them, and distilling the purified acids to obtain a fraction having $C_8$ to $C_{16}$ chains. After the acids had been dissolved in mineral oil, two parts of alpha-alpha-gamma-gamma tetramethylbutyl hydroxybenzyl dimethylamine was added followed by one part of oil of bergamot.

This preparation was used for the treatment of contagious dermititis of a thoroughbred horse in which there were reddened areas under the girth with serum-like exudate accompanied by loss of hair. These areas were brushed with the above preparation daily for two weeks, a total of 12 oz. of the preparation being applied, resulting in complete recovery with return of hair. The increased comfort of the animal immediately following the initiation of treatment was noteworthy.

I claim:

1. A germicidal and fungicidal composition of matter suitable for application to human and animal tissue, comprising water-insoluble acids from oxidized petroleum hydrocarbons and in chemical combination therewith a hydroxybenzyl non-aromatic tertiary amine.

2. A germicidal and fungicidal composition comprising water-insoluble acids derived from the catalytic oxidation of petroleum hydrocarbons and in chemical combination therewith an alkylhydroxybenzyldimethylamine.

3. A germicidal and fungicidal composition comprising water-insoluble acids derived from the catalytic oxidation of petroleum hydrocarbons and in chemical combination therewith alpha - alpha - gamma-gamma-tetramethylbutyl-hydroxybenzyldimethylamine.

4. An ointment containing water-insoluble acids from the oxidation of petroleum hydrocarbons and chemically combined therewith an amine from the series of ortho- and para-hydroxybenzyl non-aromatic tertiary amines.

5. An ointment containing water-insoluble acids from the oxidation of petroleum hydrocarbons and chemically combined therewith an alkylhydroxybenzyldimethylamine.

6. A germicidal and fungicidal composition suitable for external application which contains water-insoluble acidic oxidation products of petroleum hydrocarbons and in chemical combination therewith an alkylhydroxybenzyldimethylamine in an amount sufficient to overcome the irritating action upon human and animal tissue of the said acidic products.

7. A composition suitable for creating anesthesia of the terminal nerves upon external application, containing water-insoluble acids from the oxidation of petroleum hydrocarbons and in chemical combination therewith an alkylhydroxybenzyldimethylamine.

8. A germicidal and fungicidal composition having anesthetic effects on terminal nerves, suitable for external application comprising the reaction product of a water-insoluble acid from the oxidation of petroleum hydrocarbons and an alkylhydroxybenzyldimethylamine.

CLARENCE E. EARLE.